United States Patent
Lee et al.

(10) Patent No.: US 10,627,964 B2
(45) Date of Patent: Apr. 21, 2020

(54) ELECTRONIC DEVICE WITH TOUCH SENSOR INCLUDING INDEX MATCHING LAYER AND METHOD OF MANUFACTURING THE SAME

(71) Applicant: Samsung Display Co., Ltd., Yongin-si (KR)

(72) Inventors: Seungrok Lee, Yongin-si (KR); Sunhaeng Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 15/486,223

(22) Filed: Apr. 12, 2017

(65) Prior Publication Data

US 2017/0293381 A1    Oct. 12, 2017

(30) Foreign Application Priority Data

Apr. 12, 2016  (KR) .......................... 10-2016-0045074

(51) Int. Cl.
*G06F 3/044*    (2006.01)

(52) U.S. Cl.
CPC .... *G06F 3/044* (2013.01); *G06F 2203/04103* (2013.01); *G06F 2203/04112* (2013.01)

(58) Field of Classification Search
CPC .......... G06F 3/044; G06F 3/041; G06F 3/047; G06F 3/0414; G06F 1/16; G01N 23/04
See application file for complete search history.

(56) References Cited

U.S. PATENT DOCUMENTS

| | | | | |
|---|---|---|---|---|
| 2010/0233930 A1* | 9/2010 | Ishida | ................. | G06F 3/0412 445/24 |
| 2011/0141034 A1* | 6/2011 | Lai | ......................... | G06F 3/041 345/173 |
| 2013/0016047 A1* | 1/2013 | Masumoto | ......... | G02F 1/13338 345/173 |
| 2013/0222282 A1* | 8/2013 | Huang | .................. | G06F 3/044 345/173 |
| 2013/0222317 A1* | 8/2013 | Abiru | ................. | G02F 1/13338 345/173 |

(Continued)

FOREIGN PATENT DOCUMENTS

| KR | 10-2011-0000722 | 1/2011 |
|---|---|---|
| KR | 10-1219313 | 1/2013 |

(Continued)

*Primary Examiner* — Jennifer Mehmood
*Assistant Examiner* — James S Nokham
(74) *Attorney, Agent, or Firm* — H.C. Park & Associates, PLC

(57) ABSTRACT

A method of manufacturing an electronic device including forming a first conductive pattern layer on a base layer, forming an organic layer on which a plurality of contact holes exposing a portion of the first conductive pattern layer on the base layer are defined, forming a resin pattern layer covering the contact holes on the organic layer, forming an insulating layer covering at least a portion of the resin pattern layer on the organic layer, removing the resin pattern layer such that an index matching layer is formed by removing at least the portion covering the resin pattern layer, and forming a second conductive pattern layer on the index matching layer. An electronic device constructed according to the method of manufacturing is also disclosed.

8 Claims, 14 Drawing Sheets

(56) References Cited

U.S. PATENT DOCUMENTS

| | | | | |
|---|---|---|---|---|
| 2014/0063373 A1* | 3/2014 | Wu | ................... | G02F 1/13338 349/12 |
| 2014/0354906 A1* | 12/2014 | Wu | ....................... | G06F 3/041 349/12 |
| 2014/0355738 A1* | 12/2014 | O'Neill | ................ | G01N 23/04 378/62 |
| 2014/0368757 A1* | 12/2014 | Chen | ................ | H03K 17/9622 349/12 |
| 2016/0378216 A1* | 12/2016 | Lee | ....................... | G06F 3/041 345/173 |

FOREIGN PATENT DOCUMENTS

| | | |
|---|---|---|
| KR | 10-2015-0017284 | 2/2015 |
| KR | 10-1521775 | 5/2015 |

* cited by examiner

ELECTRONIC DEVICE WITH TOUCH SENSOR INCLUDING INDEX MATCHING LAYER AND METHOD OF MANUFACTURING THE SAME

CROSS-REFERENCE TO RELATED APPLICATIONS

This application claims priority from and the benefit of Korean Patent Application No. 10-2016-0045074, filed on Apr. 12, 2016, which is hereby incorporated by reference for all purposes as if fully set forth herein.

BACKGROUND

Field

The invention relates generally to an electronic device and a method of manufacturing the same, and, more particularly, to an electronic display device including a touch sensor and a method of manufacturing the same.

Discussion of the Background

Electronic devices are activated by receiving an applied electrical signal. Electronic devices sometimes include a touch screen for detecting an external touch applied to a display device capable of displaying an image.

The touch screens in electronic devices may include various electrode patterns configured to be activated by an electronic signal. The region of the touch screen in which the electrode patterns are activated displays information and/or responds to an external touch applied from outside the device. The electrode patterns often are not uniform across the touch screen, which can result in regions of the patterns being visible to a user.

The above information disclosed in this Background section is only for enhancement of understanding of the background of the inventive concepts, and, therefore, it may contain information that does not form the prior art that is already known in this country to a person of ordinary skill in the art.

SUMMARY

The inventors have discovered that the electrode patterns in a touch screen can cause undesirable reflection of external light from the display device, which results in the electrode patterns being visible to a user. Electronic devices constructed according to the principles of the invention, and methods of manufacturing the electronic devices, are capable of resolving the visibility issue of electrode patterns due to reflection of external light, without requiring complex manufacturing process. For example, electronic devices and methods according to the principles of the invention may include an index matching layer without contact holes formed therein.

Additional aspects will be set forth in the detailed description which follows, and, in part, will be apparent from the disclosure, or may be learned by practice of the inventive concepts.

According to one aspect of the invention, a method of manufacturing an electronic device includes forming a first conductive pattern layer on a base layer, forming an organic layer on which a plurality of contact holes exposing a portion of the first conductive pattern layer on the base layer are defined, forming a resin pattern layer covering the contact holes on the organic layer; forming an insulating layer covering at least a portion of the resin pattern layer on the organic layer, removing the resin pattern layer such that an index matching layer is formed by removing at least the portion covering the resin pattern layer, and forming a second conductive pattern layer on the index matching layer.

The base layer may include an active region and a peripheral region adjacent to the active region, and the step of forming a first conductive pattern layer includes forming a plurality of first electrodes in the active region, a plurality of first wirings in the peripheral region connected to the plurality of first electrodes, a plurality of second wirings in the peripheral region insulated from the plurality of first wirings, and a plurality of pads respectively connected to the plurality of first wirings and the plurality of second wirings. The plurality of contact holes may respectively overlap the plurality of second wirings.

The step of forming the first conductive pattern layer may further include sequentially laminating a first conductive layer and a second conductive layer on the base layer, patterning the second conductive layer such that first patterns disposed in the peripheral region are formed, and patterning the first conductive layer such that second patterns are formed. The plurality of first electrodes may be formed by the second patterns, and at least one of the plurality of first wirings and the plurality of second wirings may be formed by the first and second patterns.

The step of forming the first conductive pattern layer may further include forming a plurality of dummy patterns insulated from the plurality of first electrodes. The plurality of second wirings may be connected to a portion of the plurality of dummy patterns, and the plurality of dummy patterns may be formed by the second patterns.

The step of forming the second conductive pattern layer may further include forming a plurality of second dummy patterns in the active region insulated from a plurality of second electrodes.

The step of forming the second conductive pattern layer may include forming a plurality of second electrodes respectively facing the plurality of first electrodes. The plurality of second electrodes may be respectively connected to the plurality of second wirings through the plurality of contact holes.

In the step of forming the resin pattern layer, the resin pattern layer might not be formed to overlap the active region.

The step of forming the organic layer may include applying an organic material on the base layer to cover the first conductive pattern layer, and forming the plurality of contact holes in the organic material.

In the step of forming the resin pattern layer, the plurality of contact holes may be filled with the resin pattern layer.

The step of forming the resin pattern layer may include a printing process.

The method may further include removing the resin pattern layer.

According to another aspect of the invention, an electronic device includes a base layer having an active region and a peripheral region adjacent to the active region, a plurality of first electrodes disposed in the active region, a plurality of first wirings disposed in the peripheral region connected to the plurality of first electrodes, a second wiring disposed in the peripheral region and insulated from the plurality of first wirings, a first conductive pattern layer disposed in the peripheral region and including a plurality of pads connected to the plurality of first and second wirings, an organic layer disposed on the first conductive pattern layer and having a plurality of contact holes configured to expose at least a portion of the plurality of second wirings defined therein, an index matching layer disposed on the organic layer overlapping the active region, and a second conductive pattern layer disposed on the index matching layer and connected to the plurality of second wirings through the plurality of contact holes, wherein the second conductive layer may cover an upper surface of the index matching layer.

The plurality of first electrodes may extend in a first direction, and include a plurality of first sensing patterns at least some of which are arranged in the first direction, and a plurality of first connecting patterns which are alternately disposed with the plurality of first sensing patterns and at least some of which connect adjacent first sensing patterns.

The second conductive pattern layer may include a plurality of second electrodes at least some of which extend in a second direction transverse to the first direction, and the plurality of second electrodes may include a plurality of second sensing patterns at least some of which are arranged in the second direction, and a plurality of second connecting patterns which are alternately disposed with the plurality of second sensing patterns and at least some of which connect adjacent second sensing patterns.

The first conductive pattern layer may further include a plurality of first dummy patterns disposed in the active region, spaced apart from the plurality of first electrodes, and having at least a portion connected to the plurality of second wirings. The second conductive pattern layer may further include a plurality of second dummy patterns disposed in the active region and spaced apart from the plurality of second electrodes. The plurality of first dummy patterns may overlap the plurality of second sensing patterns. The plurality of second dummy patterns may overlap the plurality of first sensing patterns.

The index matching layer may include a first refraction layer, and a second refraction layer disposed on the first refraction layer and having a refractive index lower than that of the first refractive layer.

The index matching layer might not overlap the plurality of pads.

The index matching layer might not overlap the plurality of second wirings.

A first opening part overlapping the plurality of pads and a second opening part entirely overlapping the plurality of contact holes may be defined in the index matching layer.

The second conductive layer may cover one side surface of the index matching layer. The side surface may be adjacent to the plurality of contact holes.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
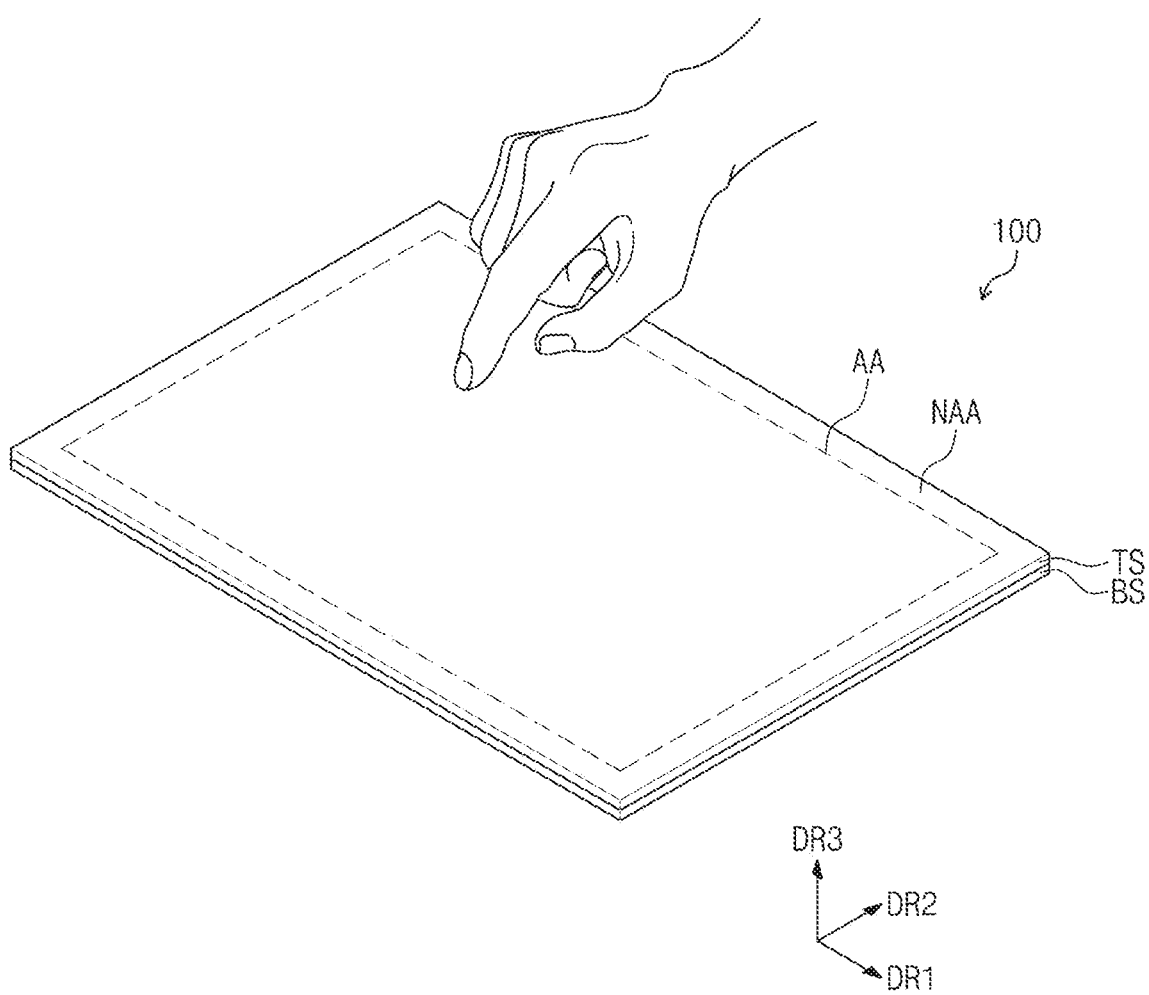
FIG. 1 is a perspective view of an electronic device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the invention will be described in detail with reference to the accompanying drawings.

Figure 2:
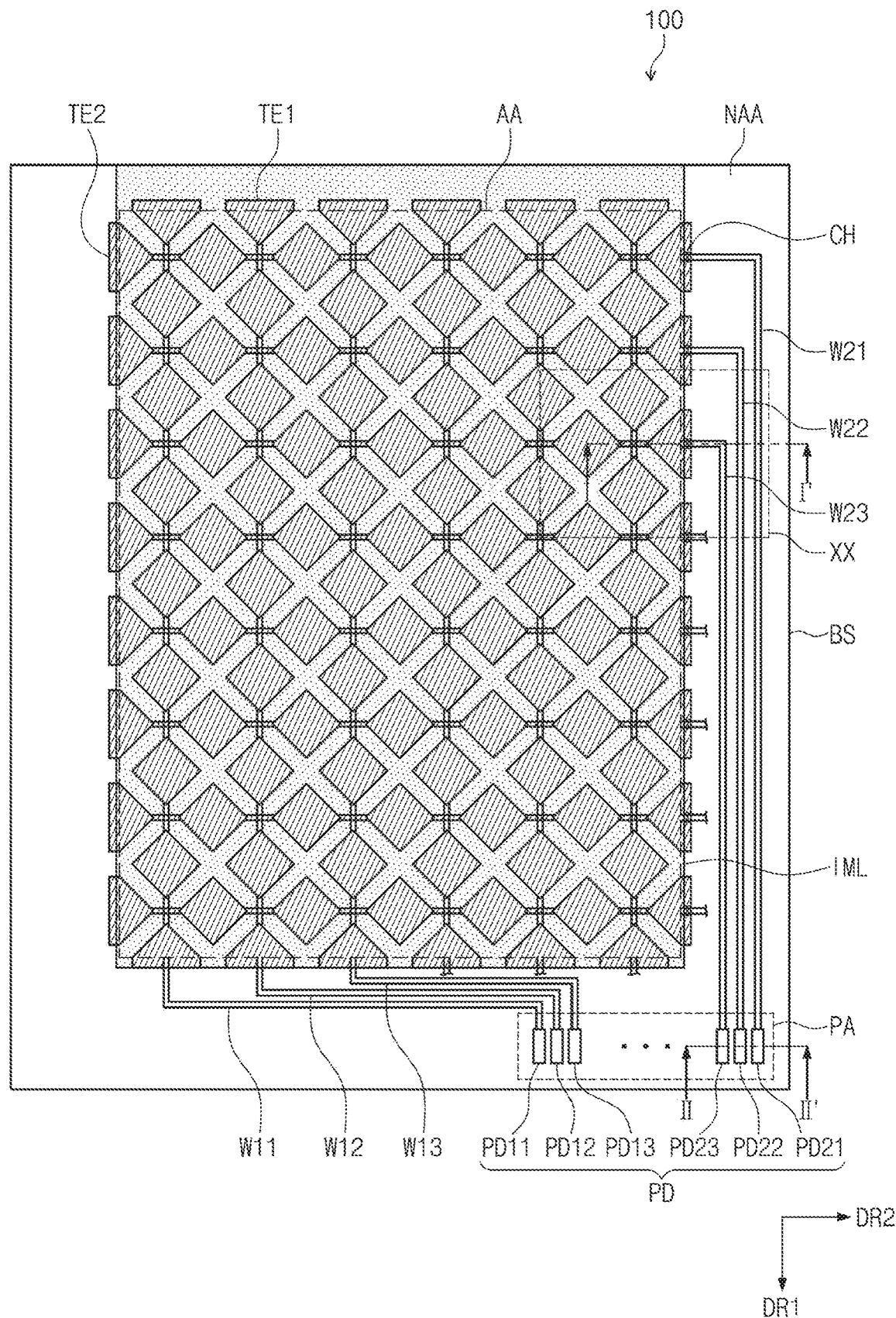
FIG. 2 is a schematic plan view of selected components of the electronic device of FIG. 1, including a first embodiment of an index matching layer.
Figure 3:
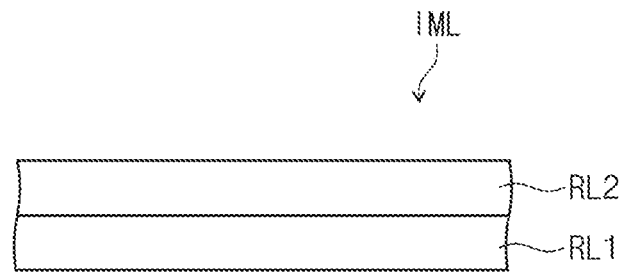
FIG. 3 is a schematic cross-sectional view of an index matching layer of an electronic device constructed according to the principles of the invention.

FIG. 1 is a perspective view of an electronic device constructed according to the principles of the invention. FIG. 2 is a schematic plan view illustrating some components of the electronic device of FIG. 1. FIG. 3 is a schematic cross-sectional view illustrating some components of the electronic device of FIG. 1. Hereinafter, with reference to FIGS. 1 to 3, an electronic device 100 according to an embodiment of the invention will be described.

As illustrated in FIG. 1, an electronic device 100 detects an external touch, i.e., a touch applied from outside device 100. For example, the electronic device 100 may be a touch screen or a touchable display device.

Meanwhile, the external touch may be provided in various ways. FIG. 1 illustrates an example in which a portion of a body such as a hand of a user approaches or contacts the electronic device 100 and is detected as a touch.

However, the electronic device 100 may also or alternatively detect, as a touch, a state in which a portion of an intangible object such as a stylus pen approaches or contacts the electronic device 100. Also, the electronic device 100 may detect an external touch through various methods including optical, contacting, or magnetic methods.

The electronic device 100 may be divided into an active region AA and a peripheral region NAA, as depicted, for example, in the perspective view of FIG. 1 and the plan view of FIG. 2. When an electrical signal is applied, the active region AA is activated so as to detect an external touch.

The active region AA is defined in a position generally towards the center of the electronic device 100 when viewed in plan view. The active region AA may alternatively be defined towards an outer region of the electronic device 100 according to the usage type of the electronic device 100. Thus, the shape and relative orientation and location of the active region AA and the peripheral region NAA may vary.

The peripheral region NAA is defined adjacent to the active region AA. The electronic device 100 does not detect an external touch applied to the peripheral region NAA. The peripheral region NAA may have a frame-like shape surrounding the active region AA.

The electronic device 100 includes a base layer BS and a touch sensor TS. The base layer BS may be a basic layer on which is disposed a touch sensor TS.

For example, the base layer BS may be an insulating substrate or an insulating film. When the base layer BS is an insulating substrate, the electronic device 100 may have relatively higher stiffness than if formed as a film. When the base layer BS is an insulating film, the electronic device 100 may have relatively higher flexibility than if formed as a substrate.

The base layer BS may be a display substrate including a plurality of pixels. The plurality of pixels receives electrical signals to thereby generate an image. The electronic device 100 may be a display device integrated with a touch screen.

The details of the base layer BS are exemplary and may take other forms and/or include other compositions as is known in the art.

An external touch applied may substantially be detected by the touch sensor TS. The touch sensor TS is disposed on the base layer BS. In FIG. 1, the touch sensor TS is disposed on an upper side of the base layer BS. Alternatively, the touch sensor TS may be disposed under the base layer BS.

As illustrated in FIG. 2, the touch sensor TS includes a plurality of first electrodes TE1 disposed in columns, a plurality of second electrodes TE2 disposed in rows, a plurality of wirings W11, W12, W13, W21, W22, and W23, a plurality of pads PD, and an index matching layer IML.

The plurality of first electrodes TE1 and the plurality of second electrodes TE2 are disposed in the active region AA. The touch sensor TS may be operated through an electrostatic capacitive method in which an external touch is detected through electrostatic capacitance coupling between the plurality of first electrodes TE1 and the plurality of second electrodes TE2.

Alternatively, the touch sensing unit TS may detect an external touch through various other methods known in the art such as a resistive film method, an optical method, an ultrasonic method, a coordinate recognition method, or the like, and may have a corresponding electrode structure.

The plurality of first electrodes TE1 and the plurality of second electrodes TE2 may intersect and be insulated from each other. The electronic device 100 senses an external touch through an electrical change between the electrodes crossing each other in an insulated manner.

For example, the plurality of first electrodes TE1 may output sensing signals, and the plurality of second electrodes TE2 may receive driving signals. The electronic device 100 may scan the active region AA by applying driving signals to the plurality of second electrodes TE2, and may detect a region in which a touch is applied through the sensing signals output from the plurality of first electrodes TE1.

Alternatively, the plurality of first electrodes TE1 may receive driving signals, and the plurality of second electrodes TE2 may output sensing signals. In addition, other types of electrical signals may be received or output to and/or from the plurality of first electrodes TE1 and the plurality of second electrodes TE2. The touch sensor TS may operate in a variety of ways known in the art and is not limited to the examples given herein.

The plurality of wirings W11, W12, W13, W21, W22, and W23 and the plurality of pads PD may be disposed in the peripheral region NAA. The plurality of wirings W11, W12, W13, W21, W22, and W23 respectively connect the plurality of first electrodes TE1 and the plurality of second electrodes TE2 to the plurality of pads PD.

For convenience in description, some of the plurality of first wirings W11, W12 and W13 and some of the plurality of second wirings W21, W22 and W23 are illustrated. The plurality of first wirings W11, W12 and W13 are connected to the plurality of first electrodes TE1 and the plurality of second wirings W21, W22 and W23 are connected to the plurality of second electrodes TE2. Each of the additional wirings may be respectively connected to the corresponding electrodes from among the plurality of first electrodes TE1 and the plurality of second electrodes TE2.

A pad region PA may be defined in a portion of the peripheral region NAA. A plurality of pads PD are disposed in the pad region PA. The touch sensor TS may be connected to a power supply and a driving circuit through the plurality of pads PD.

The plurality of pads PD includes a plurality of first pads PD11, PD12 and PD13 and a plurality of second pads PD21, PD22 and PD23. For convenience in description and illustration, additional pads are not illustrated but may be included.

The plurality of first pads PD11, PD12 and PD13 are connected to the plurality of first wirings W11, W12 and W13, and the plurality of second pads PD21, PD22 and PD23 are connected to the plurality of second wirings W21, W22 and W23. The plurality of first pads PD1, PD12 and PD13 and the plurality of second pads PD21, PD22 and PD23 are illustrated as being sequentially arranged. However, the plurality of first pads PD1, PD12 and PD13 and the plurality of second pads PD21, PD22 and PD23 may be disposed alternately with each other or partially separated from each other, or in some other orientation with respect to each other.

Referring to FIGS. 2 and 3, the index matching layer IML, overlaps at least some of, and possibly the entire surface of the active region AA. The index matching layer IML may compensate for differences in refractive indexes or reflectivity between the plurality of first electrodes TE1, the plurality of second electrodes TE2 and the base substrate BS.

The index matching layer IML may include a first refraction layer RL1 and a second refraction layer RL2. The first refraction layer RL1 has a first refractive index. The second refraction layer RL2 has a second refractive index. The second refractive index may be smaller than the first refractive index.

When the first refraction layer RL1 has a refractive index higher than that of the second refractive layer RL2, the thickness of the first refractive layer RL1 may be smaller than that of the second refractive layer RL2. The index matching layer IML controls differences in refractive indexes between laminated refractive layers and thicknesses between the refractive layers, to compensate for the differences in refractive indexes between the plurality of second electrodes TE2 and the base layer BS.

The index matching layer IML may be involved in an interaction between reflected light beams in which external light incident to the active region AA is reflected from each of the plurality of first electrodes TE1 and the plurality of second electrodes TE2, and refracted light incident to the base layer BS that is reflected from the base layer BS. Accordingly, the index matching layer IML reduces or eliminates the visibility of electrodes in the active region AA due to reflection of external light.

Each of the first and second refraction layers RL1 and RL2 may include an insulating material having high transmittance. Accordingly, even though the electronic device includes a display panel, the problem in which visibility of an image is degraded due to the reflection of light by the plurality of first electrodes TE1, the plurality of second electrodes TE2, and/or the base layer BS may be reduced or eliminated by the index matching layer IML.

In the plan view of FIG. 2, for example, the index matching layer IML does not overlap the pad region PA or the contact holes CH.

The contact holes CH may be a path through which the second electrodes TE2 and the plurality of second wirings W21, W22, and W23 are electrically connected. The contact holes CH are defined in a layer different from the index matching layer IML. This will be described subsequently in detail.

When viewed in a direction in which the contact holes CH are arranged, for example, in the plan view of FIG. 2, the index matching layer IML and the contact holes CH might not overlap each other. An end of the index matching layer IML is arranged so as not to overlap the contact holes CH.

One side surface of the index matching layer IML adjacent to the contact holes CH (e.g., the right side surface of the index matching layer IML in FIG. 2) extends in a first direction DR1 in which the contact holes CH are arranged. The one side surface may be spaced apart from all the contact holes CH.

Because the index matching layer IML does not cover any of the contact holes, there is no need to remove any of the index matching layer IML to expose the contact holes and connect the plurality of second electrodes TE2 and the plurality of second wirings W21, W22, and W23 through the contact holes. This means that there is no need to use photolithography to form the index matching layer IML. Accordingly, the contact holes for connecting the plurality of second electrodes TE2 with the plurality of second wirings W21, W22, and W23 might not be provided in the index matching layer IML. This will be described subsequently in detail.

The touch sensor TS includes a first conductive pattern layer 10, a second conductive pattern layer 20 and a refractive index matching layer IML which are distinguished in cross-section. For convenience in description, FIG. 4 is a plan view illustrating certain components of the touch sensor TS overlapping each other, and FIGS. 5A to 5C are plan views illustrating certain components of the touch sensor TS separated from each other.

Figure 4:
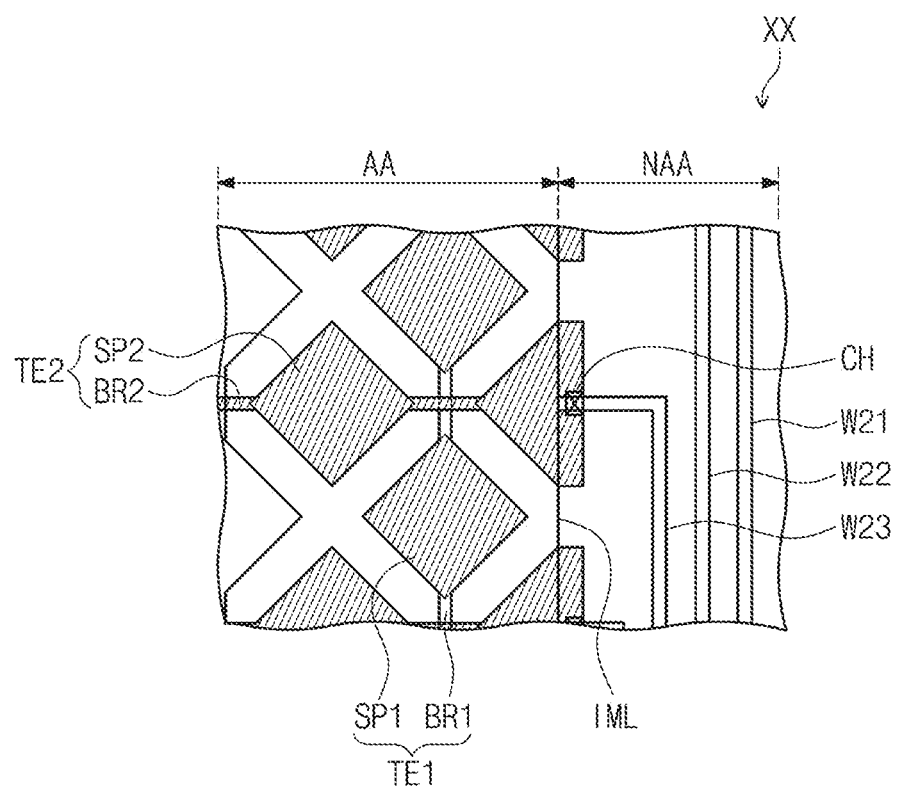
FIG. 4 is an enlarged plan view of region XX in FIG. 2.
Figure 5A:
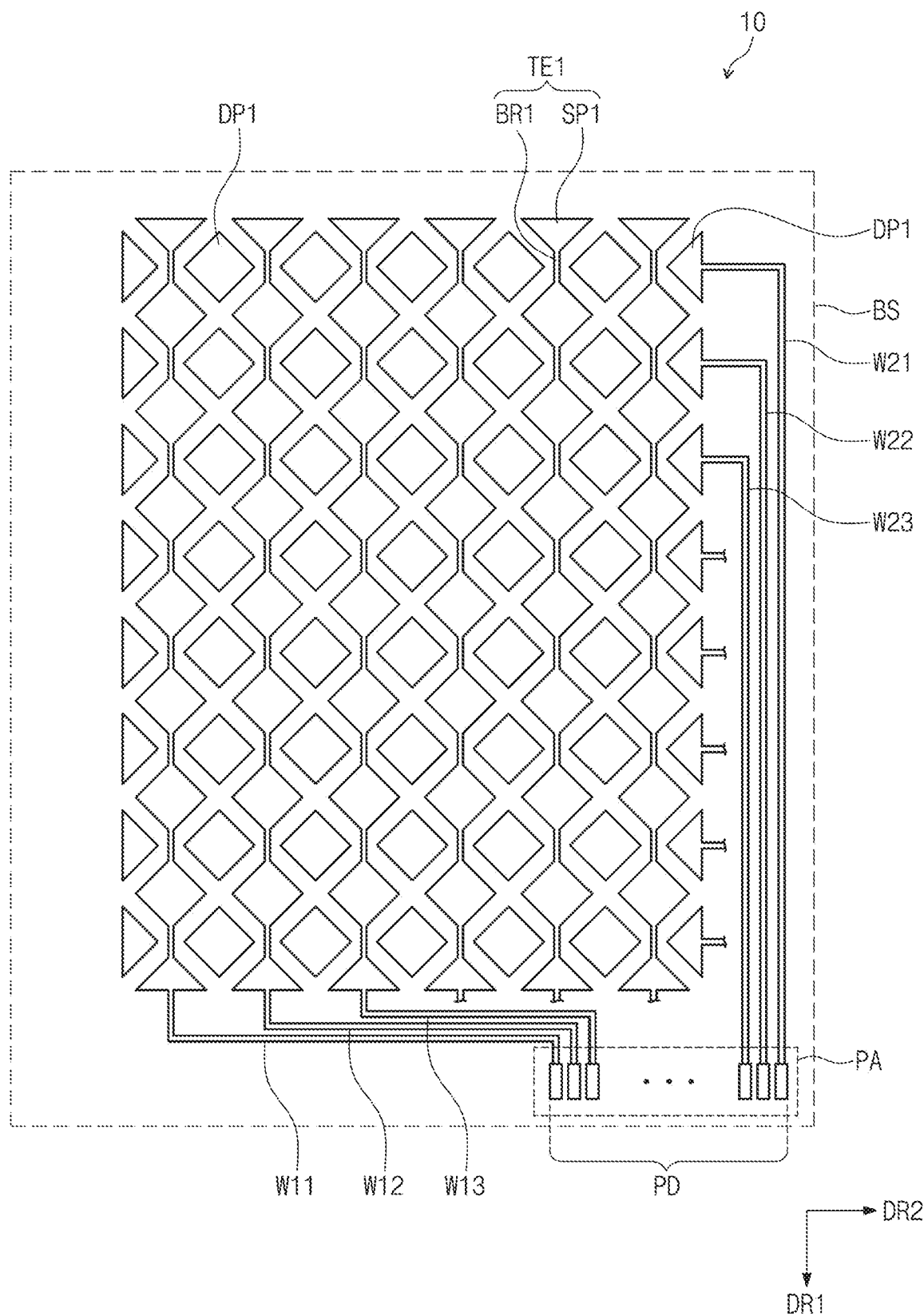
FIGS. 5A to 5D are schematic plan views of selected components of a touch sensor constructed according to the principles of the invention.
Figure 5B:
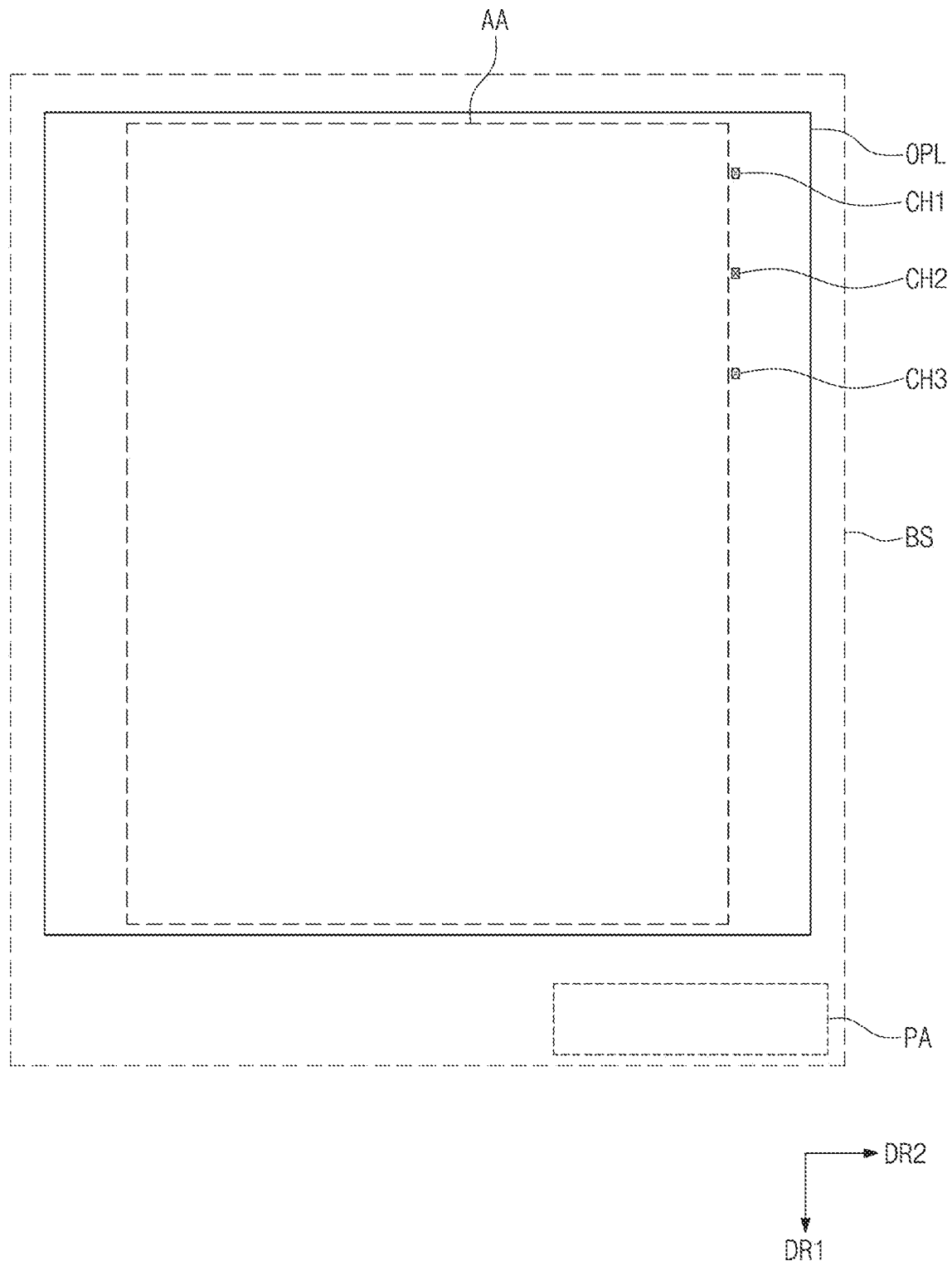
Figure 5C:
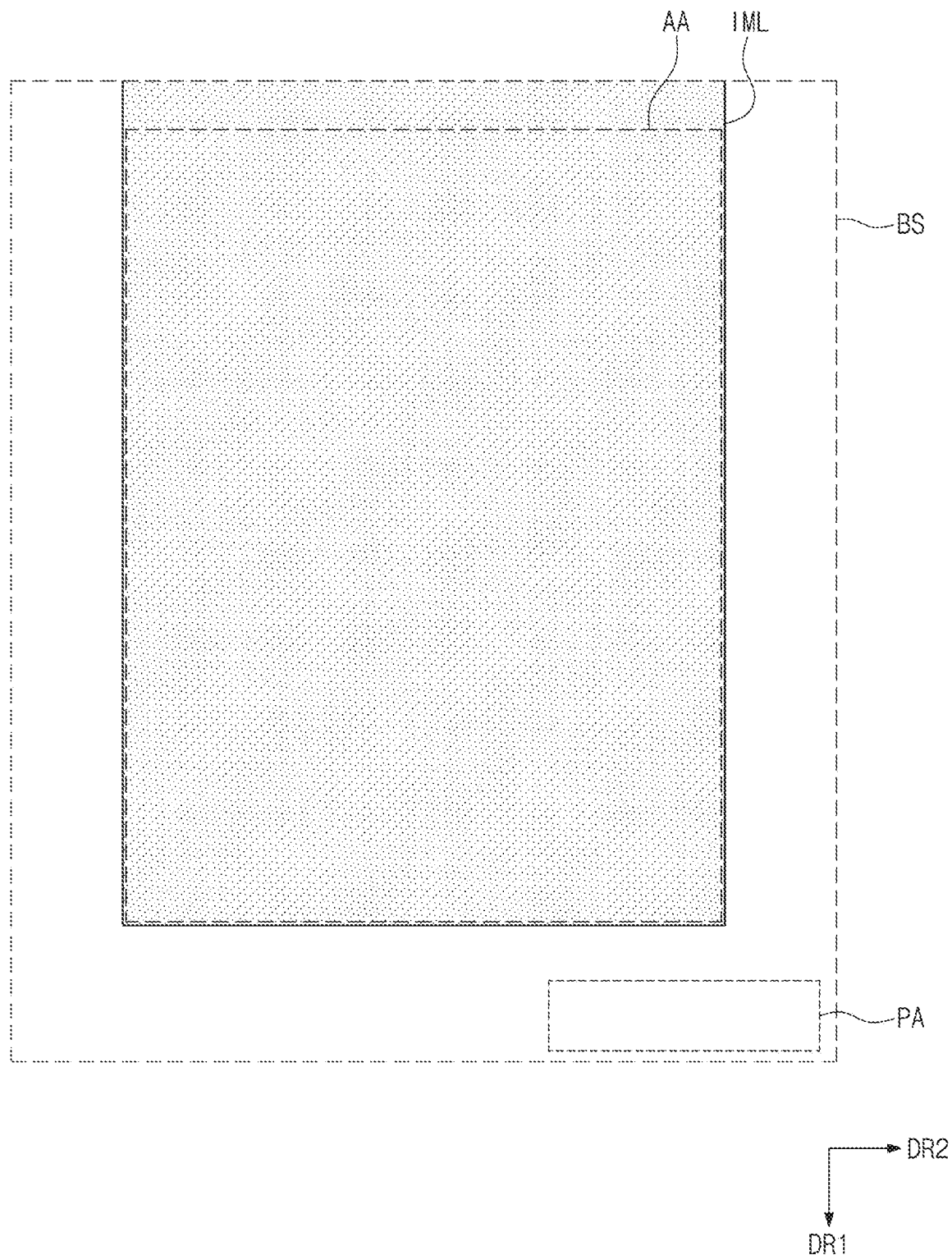

As illustrated in FIGS. 4 to 5C, the touch sensor TS includes a first conductive pattern layer 10, a second conductive pattern layer 20 and a refractive index matching layer IML which are separate layers. These components are disposed on different layers. This is illustrated in additional detail in subsequent figures.

Referring to FIGS. 4 to 5A, the first conductive pattern layer 10 may include a plurality of first electrodes TE1, a plurality of first dummy patterns DP1, a plurality of first wirings W11, W12, and W13, a plurality of second wirings W21, W22, and W23, and a plurality of pads PD.

The plurality of first electrodes TE1 may extend in a first direction DR1 and may be arranged in a second direction DR2 transverse to the first direction DR1. The plurality of second electrodes TE2 may extend in the second direction DR2 and may be arranged in the first direction DR1.

Each of the plurality of first electrodes TE1 includes a plurality of sensing patterns SP1 arranged in the first direction DR1 and a plurality of connecting patterns BR1 which are arranged alternately with the plurality of sensing patterns SP1, and each of which connects adjacent sensing patterns SP1.

The plurality of first dummy patterns DP1 is arranged in the active region AA. The plurality of first dummy patterns DP1 are disposed spaced apart from the plurality of first electrodes TE1 and are insulated from the plurality of first electrodes TE1.

The plurality of first dummy patterns DP1 are arranged spaced apart from each other and are not connected with each other. Some of the first dummy patterns DP1 may respectively be connected to the plurality of second wirings W21, W22 and W23. Each of the plurality of second wirings W21, W22 and W23 may be connected to a dummy pattern which is positioned at first position or at last position from among the plurality of first dummy patterns arranged in the second direction DR2.

The plurality of first wirings W11, W12 and W13 and the plurality of second wirings W21, W22 and W23 are disposed on the peripheral region NAA. The plurality of first wirings W11, W12 and W13 connect the plurality of first electrodes TE1 with corresponding pads PD. Ends at one extremity of the plurality of first wirings W11, W12 and W13 are connected to corresponding pads PD and ends at an opposing extremity of the plurality of first wirings W11, W12 and W13 are connected to corresponding first electrodes TE1.

The plurality of second wirings W21, W22 and W23 are connected to corresponding pads PD. Ends at one extremity of the plurality of second wirings W21, W22 and W23 are connected to corresponding pads PD. Ends at an opposing extremity of the plurality of second wirings W21, W22 and W23 are adjacent to the active region AA or partially contact the active region AA.

Referring to FIGS. 4 and 5B, an organic layer OPL overlaps the active region AA and partially overlaps the peripheral region NAA. The organic layer OPL covers at least a portion of the first conductive pattern layer 10.

For example, the organic layer OPL may cover the plurality of first electrodes TE1 and the plurality of second wirings W21, W22 and W23. The organic layer OPL covers the first conductive pattern layer 10 and provides a flat surface over the first conductive pattern layer 10.

Also, the organic layer OPL might not overlap the pad region PA. The plurality of pads PD disposed in the pad region PA may be exposed from, rather than covered by, the organic layer OPL and thereby more easily be connected to a power supply or a driving circuit which are provided from outside the touch sensor TS.

Meanwhile, the plurality of contact holes CH may be defined in the organic layer OPL as with the three contact holes CH1, CH2, and CH3 in FIG. 5B. The contact holes CH1, CH2, and CH3 may respectively correspond to the plurality of second wirings W21, W22 and W23, as shown, for example, in FIG. 2 and FIG. 4.

The contact holes CH1, CH2, and CH3 overlap a region in which the plurality of second wirings W21, W22 and W23 and the plurality of first dummy patterns DP1 are connected with each other. This is shown in greater detail in subsequent Figures. The contact holes CH1, CH2, and CH3 may be paths through which portions of the second conductive pattern 20 and the first conductive pattern 10 are connected with each other.

The contact holes CH1, CH2, and CH3 may be defined as an integrated shape. Here, connection portions between the plurality of second wirings W21, W22 and W23 and the plurality of first dummy patterns DP1 are arranged in the first direction DR1.

Referring to FIGS. 4 and 5C, the index matching layer IML covers at least a part of, or all of the active region AA when viewed in plan. The index matching layer IML, does not overlap the pad region PA. The index matching layer IML might not overlap a region extending in the first direction DR1 in the peripheral region NAA.

Specifically, the index matching layer IML might not overlap the above-mentioned plurality of contact holes CH. Rather, the plurality of contact holes CH are defined to be arranged outside the boundaries of the index matching layer IML.

The contact holes or the like for connecting the plurality of second electrodes TE2 and the plurality of second wirings W21, W22, and W23 are not defined in some such embodiments of the index matching layer IML. This will be described subsequently in more detail.

Figure 5D:
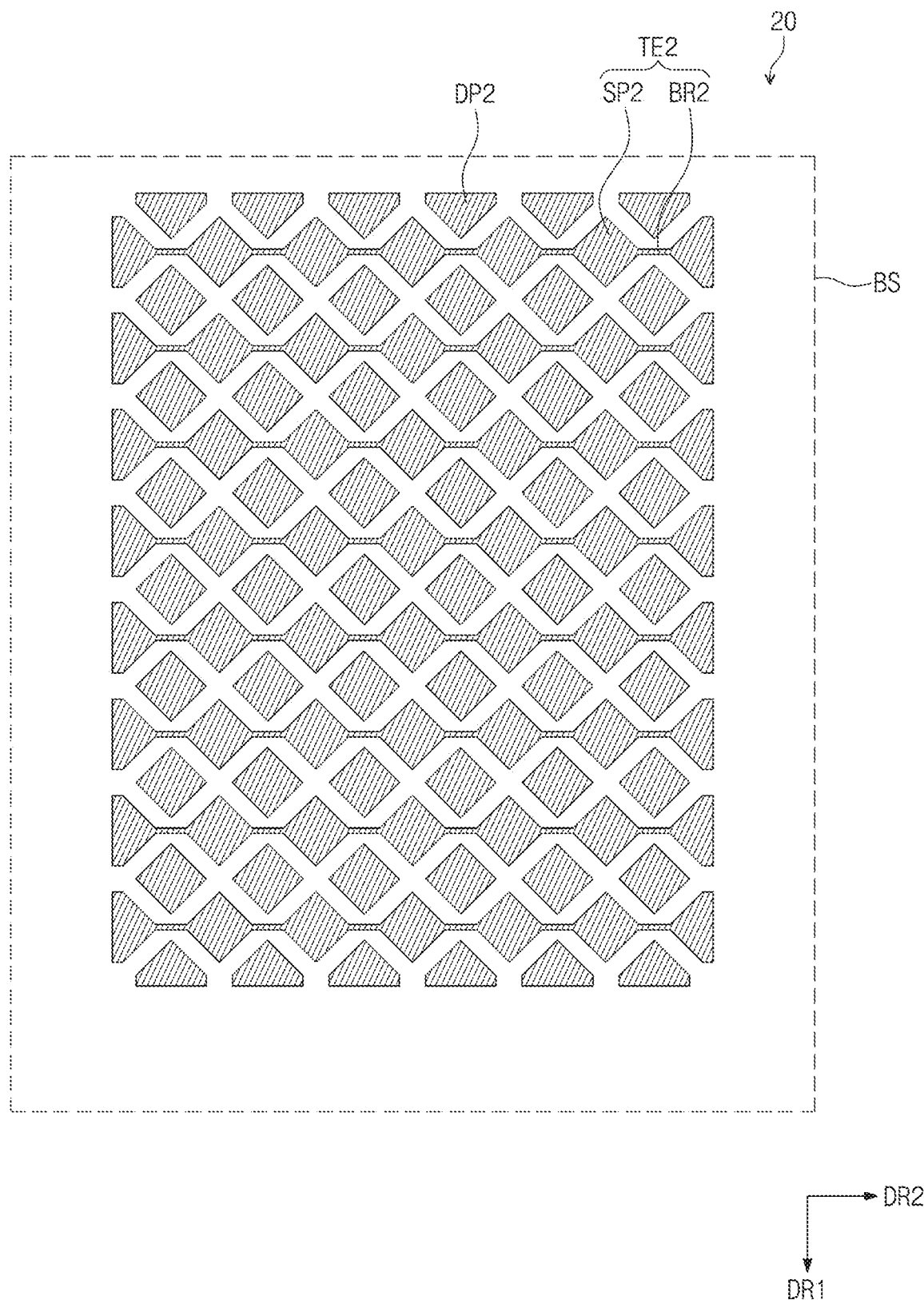

Referring to FIGS. 4 and 5D, the second conductive pattern layer 20 is disposed on the index matching layer IML. The second conductive pattern layer 20 may include a plurality of second electrodes TE2 and a plurality of second dummy patterns DP2.

Each of the plurality of second electrodes TE2 extends in the second direction DR2. Each of the plurality of second electrodes TE2 includes a plurality of sensing patterns SP2 arranged in the second direction DR2 and a plurality of connecting patterns BR2 which are disposed alternately with the sensing patterns SP2 and each of which connects adjacent sensing patterns SP2.

The plurality of second dummy patterns DP2 are disposed in the active region AA. The plurality of second dummy patterns DP2 are respectively disposed between the second electrodes TE2 and are arranged spaced apart from each other.

The plurality of second dummy patterns DP2 are not connected to the plurality of second electrodes TE2. The plurality of second dummy patterns DP2 respectively overlap a plurality of first sensing patterns SP1 when viewed in plan.

The plurality of second dummy patterns DP2 may substantially correspond to the plurality of first sensing patterns SP1. The touch sensor TS may include the plurality of second dummy patterns DP2, and thus, the change in visibility in the active region AA between a region on which the plurality of second electrodes TE2 are disposed and a region on which the plurality of second electrodes TE2 are not disposed, may be reduced. Accordingly, when the second dummy patterns DP2 are included, the ability to sense a difference in the pattern in the active region AA between the region on which the plurality of second electrodes TE2 are disposed and the region on which the plurality of second electrodes TE2 are not disposed due to reflected light is reduced.

Some of the plurality of second electrodes TE2 extend to the peripheral region NAA. A portion of the plurality of second electrodes TE2 which overlaps the peripheral region NAA cover the other ends of the plurality of second wirings W21, W22 and W23.

In the region in which the plurality of second electrodes TE2 and the plurality of second wirings W21, W22 and W23 overlap each other, the plurality of second electrodes TE2 and the plurality of second wirings W21, W22 and W23 are connected with each other. Here, the plurality of second electrodes TE2 disposed over the index matching layer IML, may be connected to the plurality of second wirings W21, W22 and W23 disposed under the index matching layer IML without passing through the index matching layer IML because the index matching layer IML is not included in that location.

Accordingly, in the fabrication process in which the plurality of second electrodes TE2 and the plurality of second wirings W21, W22 and W23 are connected with each other, the affect of the index matching layer IML, may be reduced because the step of removing the index matching layer IML to connect the plurality of second electrodes TE2 to the plurality of second wirings W21, W22 and W23 is obviated. This will be described subsequently in detail.

Figure 6A:
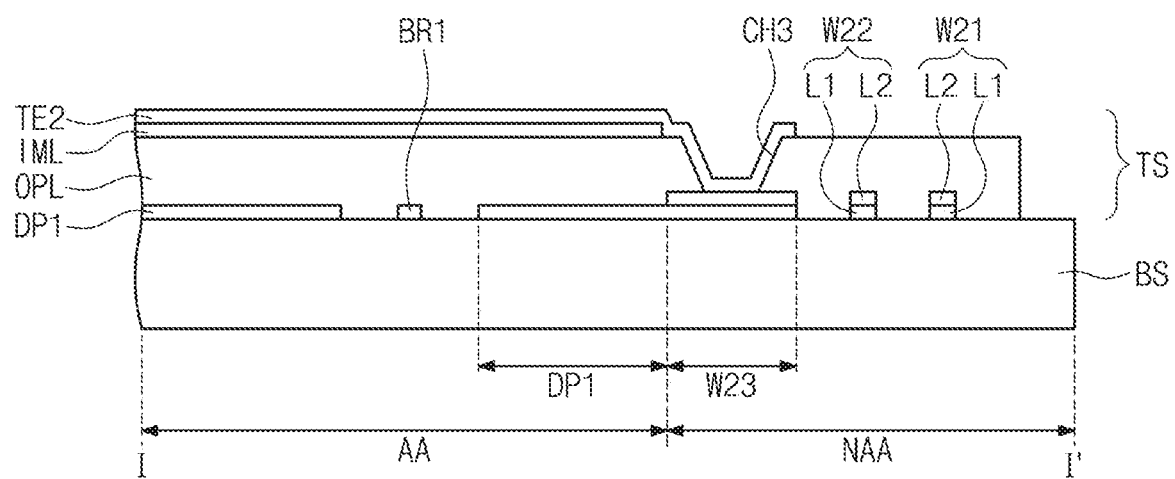
FIG. 6A is a cross-sectional view taken along line I-I' of FIG. 2.

As illustrated in FIG. 6A, the first conductive pattern layer 10 (which includes the first dummy patterns DP1 and the first connecting patterns BR1, for example, as described above in connection with FIG. 5A), the organic layer OPL, the index matching layer IML, and the plurality of second electrodes TE2 (which is one component of the second conductive pattern layer 20) may be sequentially laminated on the base layer BS. In FIG. 6A, the plurality of first dummy patterns DP1 (which is one of the components of the first conductive pattern layer 10), one of the first connecting patterns BR1, and second wirings W21, W22 and W23 (from among the larger plurality of second wirings) are shown.

Some of the plurality of second wirings W21, W22 and W23 include two second wirings W21, W22 and W23 connected to other dummy patterns and the second wiring W23 connected to the dummy pattern DP1 as illustrated in FIG. 6A. Two second wirings W21 and W22 are disposed in the peripheral region NAA and respectively include first pattern layer L1 and second pattern layer L2.

The first pattern layer L1 may define a plurality of first electrodes TE1 and the plurality of first dummy patterns DP1. The first pattern layer L1 may be disposed in the active region AA and viewed from the outside.

The first pattern layer L1 may include a conductive material having high transmittance. For example, the first pattern layer L1 may include a transparent conductive oxide (TCO) such as indium zinc oxide (IZO) or indium tin oxide (ITO).

Also, the first pattern layer L1 may be single-layered or have a structure in which a plurality of layers is laminated. Alternatively, the first pattern layer L1 may have a mesh shape when viewed in plan.

The second pattern layer L2 may include a conductive material having high transmittance. For example, the second pattern layer L2 may include copper, gold, silver, aluminum, iron, or alloys thereof or the like. The plurality of second wirings W21, W22 and W23 include the second pattern layer L2, and thus may have a low resistance and improved electrical characteristics.

The first pattern layer L1 of the plurality of second wiring W23 is connected to the dummy pattern DP1. The first pattern layer L1 of the second wiring W23 may be integrally provided with the dummy pattern DP1 as shown in FIG. 6A.

The organic layer OPL covers the first conductive pattern layer 10. The organic layer OPL may cover the plurality of first dummy patterns DP1, the plurality of first electrodes TE1, and the plurality of second wirings W21, W22 and W23 and may provide a flat upper surface thereof in which contact hole CH3 is defined, as shown, in FIG. 6A.

FIG. 6A illustrates one of the contact holes CH3 defined on the organic layer OPL. The contact hole CH3 exposes at least some of the second wiring W23 connected to the first dummy pattern DP1.

The index matching layer IML, is disposed on the organic layer OPL. The index matching layer IML does not overlap the contact hole CH3 as seen in the cross-section of FIG. 6A. Rather, the boundary of the contact hole CH3 is defined outside the index matching layer IML.

The plurality of second electrodes TE2 is disposed on the index matching layer IML. The plurality of second electrodes TE2 are disposed in the active region AA and connected to the second wiring W23 through the contact hole CH3.

The plurality of second electrodes TE2 may cover a side surface of the index matching layer IML, as shown at left side of FIG. 6A. The plurality of second electrodes TE2 may thus be connected to the second wiring W23 without passing through the index matching layer IML at the location of the contact hole CH3.

Figure 6B:
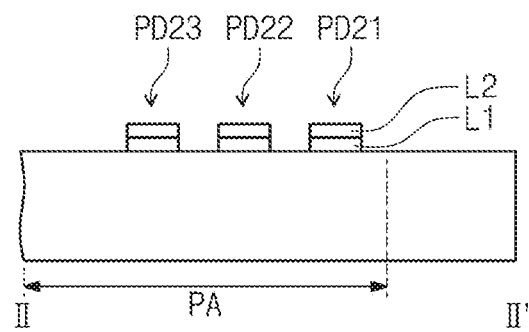
FIG. 6B is a cross-sectional view taken along line II-IF of FIG. 2.

As illustrated in FIG. 6B, a plurality of pads are disposed on the pad region PA. FIG. 6B illustrates pads PD21, PD22 and PD23 of the plurality of pads. Descriptions of pads PD21, PD22 and PD23 may be applied respectively to corresponding to other pads, including, but not limited to pads PD11, PD 12 and PD 13.

The pads PD21, PD22 and PD23 are defined to extend, respectively, from the plurality of wirings W21, W22 and W23, as shown, for example, in FIG. 5A. Thus, the pads PD21, PD22 and PD23 may be pads respectively connected to the plurality of second wirings W21, W22 and W23.

Also, the plurality of pads PD21, PD22 and PD23 may have substantially the same structure as the plurality of wirings W21, W22 and W23. For example, the pads PD21, PD22 and PD23 may respectively have substantially the same structure as the plurality of second wirings W21, W22 and W23. Accordingly, the plurality of pads and the plurality of wirings may be simultaneously formed through the same process, and thus, the process is simplified as compared to a process where the plurality of pads and the plurality of wirings are formed in separate steps.

As illustrated in FIG. 6B, the index matching layer IML does not overlap the pad region PA (as is evident by the absence of the index matching layer IML in the cross-section of FIG. 6B). Accordingly, pads PD21, PD22 and PD23 may be exposed to the outside regardless of the formation of any index matching layer IML and without the need for any process step to remove any portion of the index matching layer IML.

Hereinafter, an electronic device 100-1 according to another embodiment of the invention will be described with reference to FIGS. 7A and 7B. Like reference numerals denote like elements in the same configuration as those illustrated in FIGS. 1 to 6B, and duplicative descriptions thereof will not be provided to avoid redundancy.

Figure 7A:
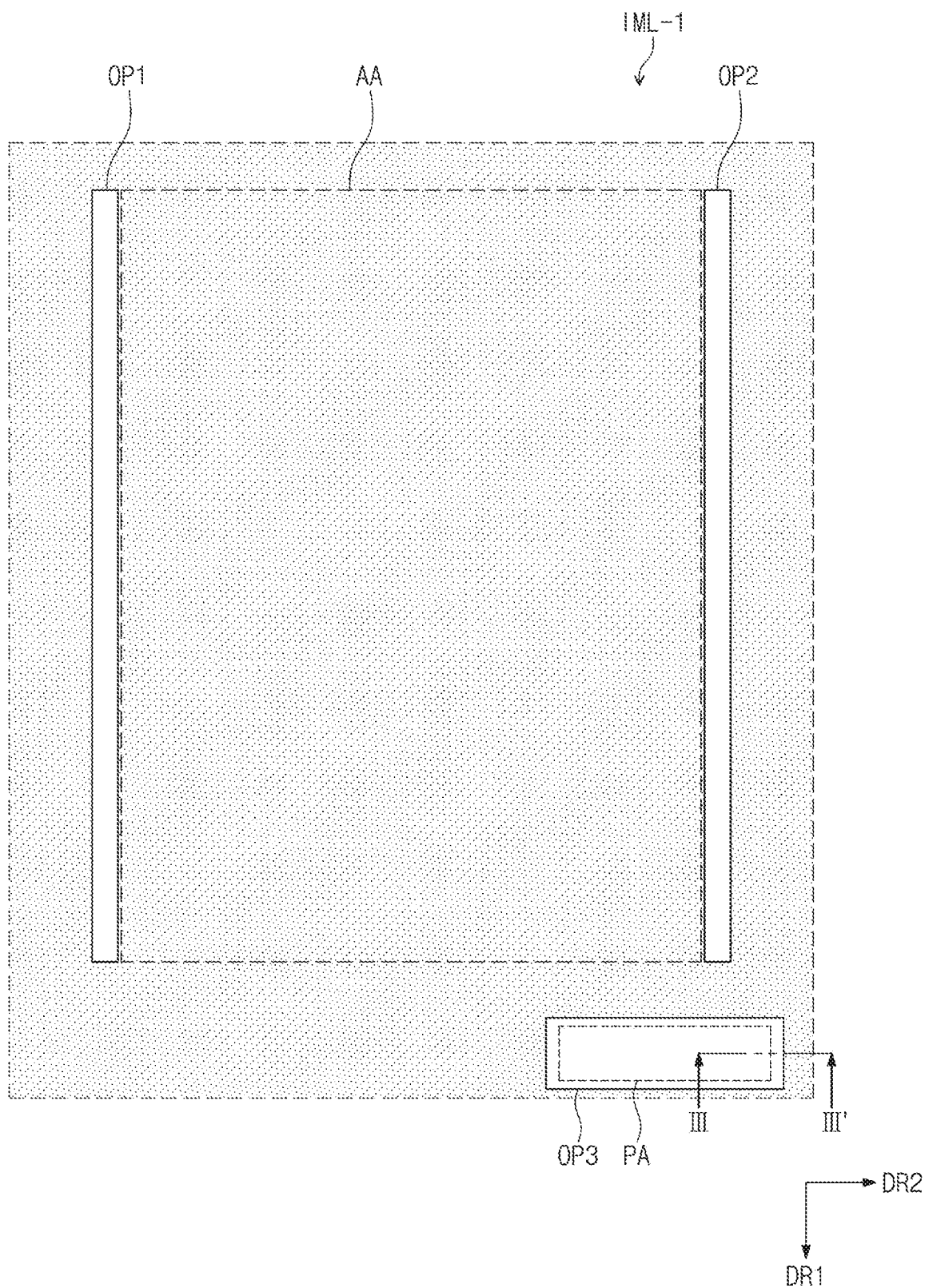
FIG. 7A is a schematic plan view of a second embodiment of an index matching layer constructed according to the principles of the invention.

As illustrated in FIG. 7A, an index matching layer IML-1 may overlap all or part of both an active region AA and a peripheral region NAA. Here, a plurality of openings OP1, OP2, and OP3 may be defined in the index matching layer IML-1. The plurality of openings OP1, OP2, and OP3 include first to third openings OP1, OP2, and OP3.

The first and second openings OP1 and OP2 are defined in a region overlapping a connection part between a second electrode layer disposed over the index matching layer IML-1 and second wirings disposed under the index matching layer IML-1. The first and second openings OP1 and OP2 may respectively overlap a plurality of contact holes CH defined in the organic layer OPL.

The first and second openings OP1 and OP2 may respectively have an elongated, linear shape extending in one direction. The first and second openings OP1 and OP2 may respectively have an elongated, linear shape extending in a first direction DR1.

The first and second openings OP1 and OP2 may be defined to be spaced apart from each other with the active region AA therebetween. In FIG. 7A, the first and second openings OP1 and OP2 are respectively spaced apart from each other in a second direction DR2.

The first and second openings OP1 and OP2 may take a variety of shapes and may be defined at a variety of positions, and are not limited to the examples described herein.

Figure 7B:
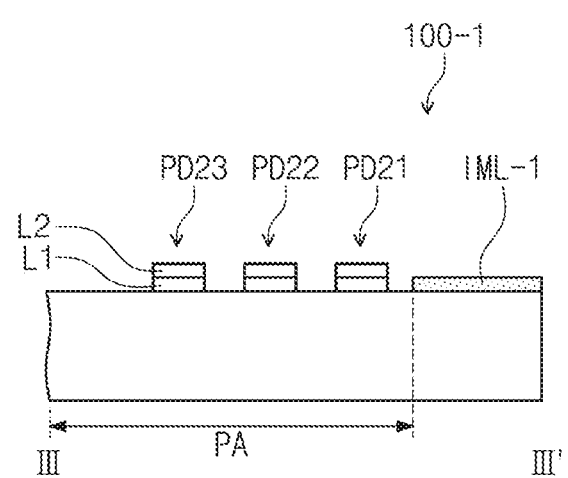
FIG. 7B is a cross-sectional view along line of FIG. 7A.

As illustrated in FIGS. 7A and 7B, the third opening part OP3 corresponds to a pad region PA. The refractive index matching layer IML-1 may be partially disposed outside the pad region PA in the peripheral region NAA. The index matching layer IML-1 might not overlap a plurality of pads PD due to the presence therein of the third opening part OP3.

Hereinafter, with reference to FIGS. 8A to 8I, a method of manufacturing an electronic device according to the principles of the invention will be described. Like reference numerals denote like elements in the same configuration as those illustrated in FIGS. 1 to 7, and overlapping descriptions thereof will not be provided to avoid redundancy.

Figure 8A:
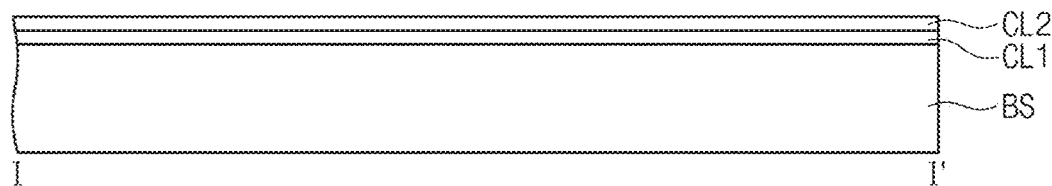
FIGS. 8A to 8I are cross-sectional views illustrating various steps in a method of manufacturing an electronic device according to the principles of the invention.

As illustrated in FIG. 8A, a first conductive layer CL1 and a second conductive layer CL2 are sequentially laminated on a base layer BS. The first conductive layer CL1 may be formed by using a first conductive material and the second conductive layer CL2 may be formed by using a second conductive material.

The first conductive layer CL1 and the second conductive layer CL2 may be formed through a deposition or sputtering process. The first conductive layer CL1 and the second conductive layer CL2 may be continuously formed through the same processes as each other or discontinuously formed through processes different from each other. Other steps to forms these layers known in the art may be used as well.

Figure 8B:
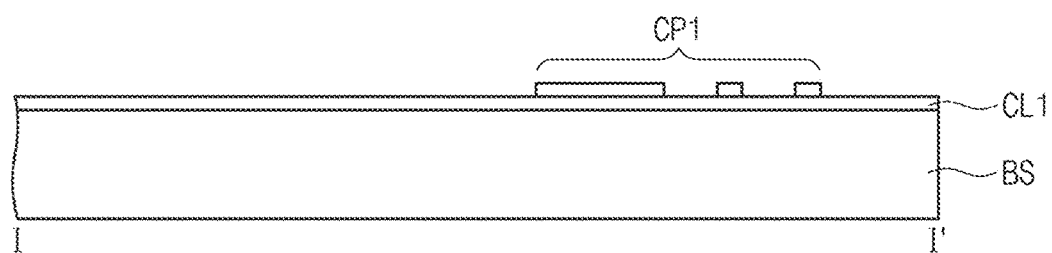

Subsequently, as illustrated in FIG. 8B, the second conductive layer CL2 is selectively patterned to form a first pattern CP1. The first pattern CP1 may be a portion of components of a plurality of wirings to be described subsequently.

The patterning of the second conductive layer CL2 may be performed through various methods. For example, only the second conductive layer CL2 might be selectively patterned by using an etching liquid or etching gas using differences in etching rates between the first and second conductive layers CL1 and CL2. This corresponds to the embodiment illustrated here. The conductive pattern CP may, in the alternative, be formed through various other methods known in the art.

Figure 8C:
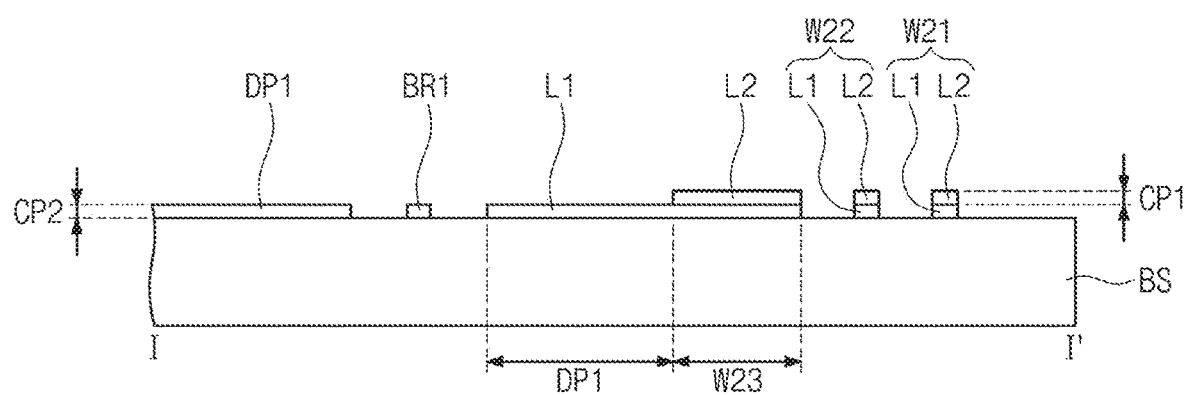

Subsequently, as illustrated in FIG. 8C, the first conductive layer CL1 is patterned to form a second pattern CP2. At least a portion of the second pattern CP2 does not overlap the first pattern CP1.

The first and second patterns CP1 and CP2 are both patterned from the first conductive layer CL1. The above-described first pattern layer L1 corresponds to the second pattern CP2 and the second pattern layer L2 corresponds to the first pattern CP1.

For example, a portion of the second pattern CP2, the portion not overlapping the first pattern CP1, may define dummy patterns DP1 and first electrodes TE1 (see FIG. 2) including a plurality of connecting patterns BR1, and a portion of the second pattern CP2, the portion that also overlaps the first pattern CP1, together with the first patterns CP1 may define a plurality of second wirings including the plurality of second wirings W21, W22, and W23.

Also, as illustrated in FIG. 8C, a portion of a plurality of first dummy patterns DP1 and the second wiring W23 connected to the portion of the dummy patterns may have an integrated shape, e.g., after being formed from one continuous conductive portion remaining from the conductive layer CL1.

In the integrated shape, a portion from which the second conductive layer CL2 among the first and second conductive layers CL1 and CL2 is selectively removed may be defined as a portion of the dummy pattern DP1, and the remaining portion may be defined as the second wiring W23. Accordingly, in a pattern partially overlapping the first pattern CP1 in the second pattern CP2, an overlapping portion constitutes the wiring W23 and a non-overlapping portion may define the first dummy pattern DP1.

According to the illustrated embodiment, electrodes disposed in the active region AA and having relatively high transmittance and the wirings disposed in the peripheral region NAA and having relatively low resistance may be simultaneously formed through one process. Accordingly, the overall fabrication process may be simplified and process costs may thereby be reduced.

Figure 8D:
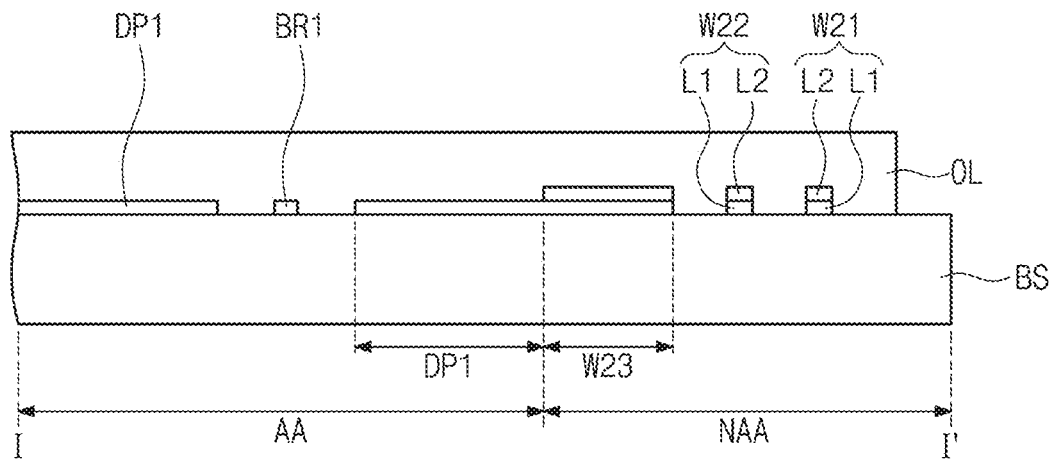
Figure 8E:
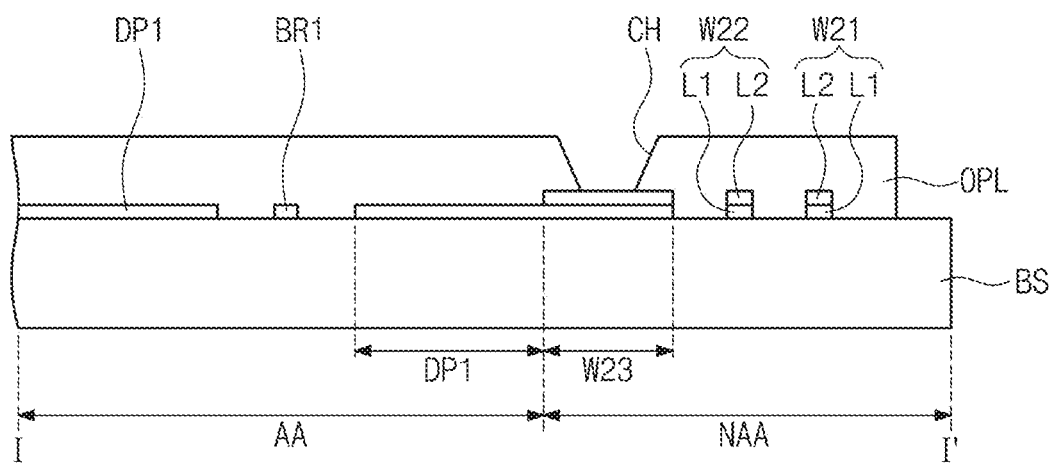

Subsequently, as illustrated in FIGS. 8D and 8E, an organic layer OPL is formed. Firstly, an organic material is applied such that the first conductive pattern layer 10 is covered on the base layer BS and thereby, an application layer OL is formed as shown in FIG. 8D.

Then, a contact hole CH is formed in a region corresponding to the second wiring W23 and thereby the organic layer OPL is formed as shown in FIG. 8E. The contact holes CH exposes at least a portion of the first conductive pattern layer 10. The contact hole CH overlaps a portion adjacent to the active region AA in the second wiring W23, specifically, the contact hole CH overlaps a portion connected to the first dummy pattern DP1.

Figure 8F:
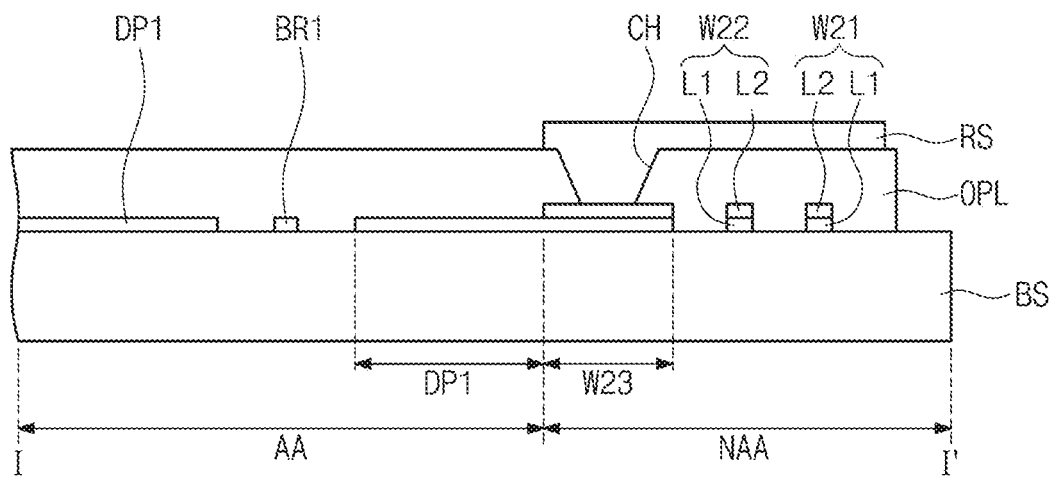

Then, as illustrated in FIG. 8F, a resin pattern RS is formed on the organic layer OPL. The resin pattern RS is disposed in the peripheral region NAA and does not overlap the active region AA. The resin pattern RS covers the contact hole CH. The resin pattern RS may fill the contact hole CH.

The resin pattern RS may be formed through various methods. For example, a polymer resin material is applied on the organic layer OPL. The application methods may be a printing method, such as screen printing, inkjet printing, or gravure offset printing, or some other method as may be known in the art.

The polymer resin material may be a material having a curing temperature lower than that of the base layer. For example, the polymer resin material may be acryl-based. Accordingly, in a process of forming the resin pattern RS, even though the polymer resin material is cured, a stable manufacturing process may be performed because the base layer is not damaged or otherwise cured prematurely.

Figure 8G:
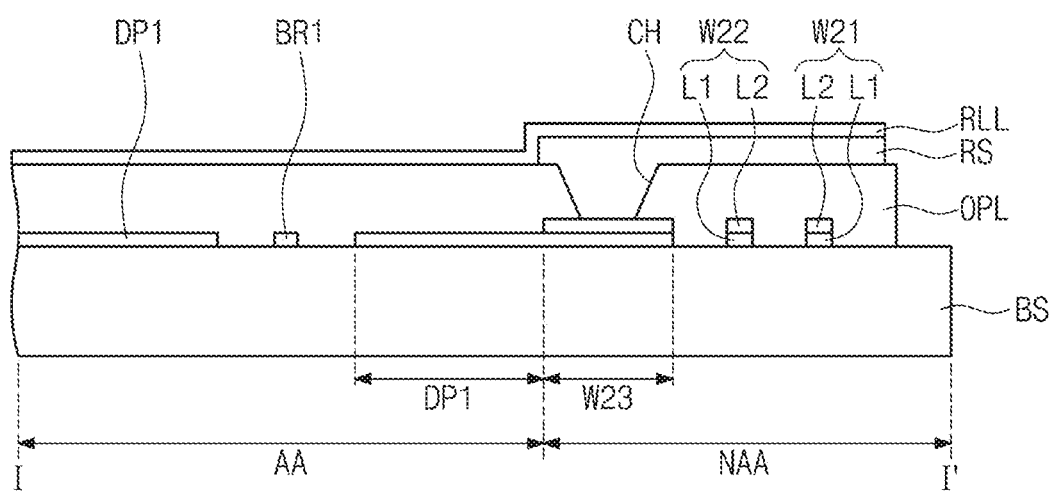

Then, as illustrated in FIG. 8G, an insulating layer RLL is formed on the organic layer OPL. Here, a portion of the insulating layer RLL covers the resin pattern RS.

The insulating layer RLL may be single-layered or may have a structure in which a plurality of layers are laminated. When having a laminated structure, the insulating layer RLL may be formed such that a plurality of layers are sequentially laminated. The insulating layer RLL may be formed through a deposition or sputtering process.

Figure 8H:
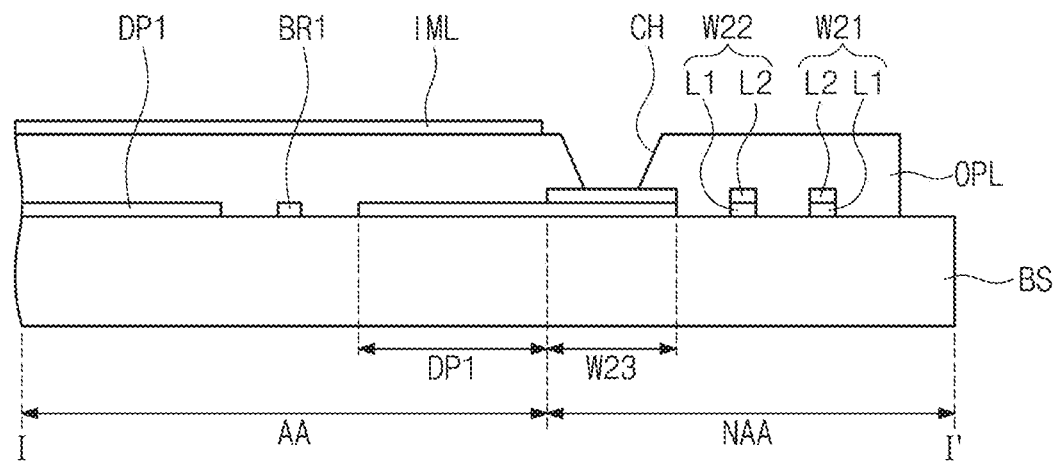

Then, as illustrated in FIG. 8H, an index matching layer IML is formed by removing the resin pattern RS. In this invention, the resin pattern RS may not be removed by photolithography, but may be removed by a strip process. Here, while the resin pattern RS is removed, a portion of the insulating layer RLL present on the resin pattern RS may be removed together.

The index matching layer IML, which was formed by removing a portion of the insulating layer RLL, does not overlap the region in which the resin pattern RS was present. Accordingly, because the resin pattern RS overlapped the contact hole CH, the index matching layer IML does not overlap the contact hole CH in the organic layer OPL in this embodiment.

Figure 8I:
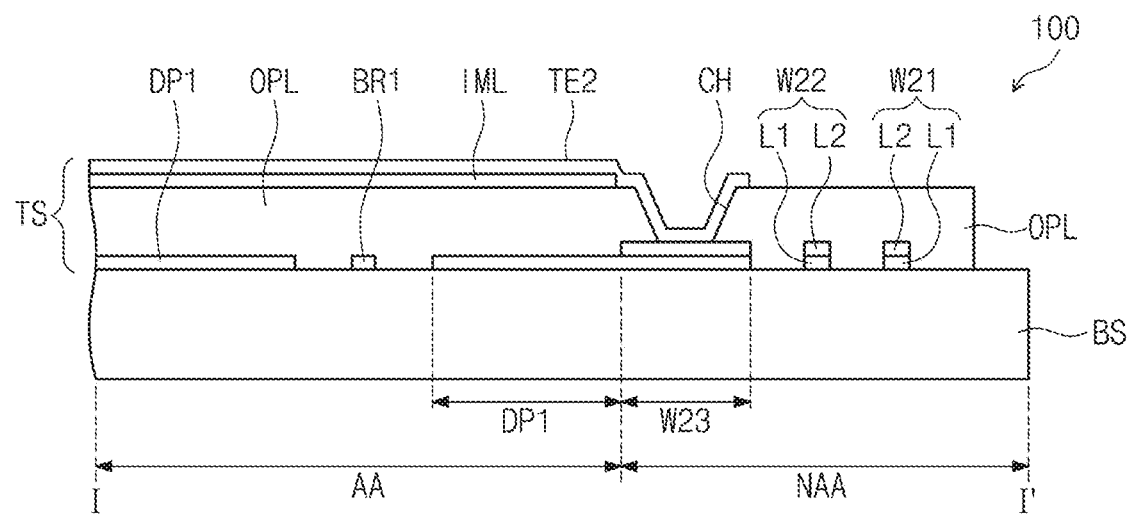

Then, as illustrated in FIG. 8I, a second conductive pattern layer is formed on the index matching layer IML. FIG. 8I illustrates a portion of the plurality of second electrodes TE2 included in the second conductive pattern layer. The first dummy patterns DP1 overlap the shown portion of the second electrodes TE2, which includes the second sensing patterns SP2 as detailed above. The second dummy patterns DP2 overlap the plurality of first sensing patterns SP1 in a manner similar to the overlap of the first dummy patterns DP1 and the second electrodes TE2 shown.

The plurality of second electrodes TE2 are physically, and thus electrically, connected to the plurality of second wirings W21, W22 and W23 through the contact hole CH. Thus, even though there is no photolithography process step forming a contact hole in the index matching layer IML, the contact hole CH of the organic layer OPL may nevertheless be readily exposed. Accordingly, the second conductive pattern layer 20 may be connected to the plurality of second wirings W21, W22 and W23, which are disposed on a different layer, without performing a process step of forming a contact hole in the index matching layer.

When the index matching layer IML, is configured from an inorganic material, a photo process or some other process for forming the contact hole in the index matching layer is used. Since such a process of forming a contact hole in the index matching layer IML is obviated in the manufacturing process according to the invention, the manufacturing process may be thereby simplified and manufacturing costs, including, but not limited to, costs associated with process time, may be saved.

According to the principles of the invention, an index matching layer adjusts the difference in refractive indexes between electrode patterns and inner insulating layers, and thus the problem of the electrode patterns being viewed due to reflection of external light may be reduced or eliminated.

In addition, according to the principles of the invention, an electrical connection part between conductive layers disposed on layers different from each other and on layers different from the index matching layer may be disposed without passing through a contact hole in the index matching layer. Thus, a photo process or the like for forming a contact hole in the index matching layer is obviated, and thus, the manufacturing process may be simplified and process costs may be saved.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. An electronic device comprising:
    a base layer having an active region and a peripheral region adjacent to the active region;
    a first conductive pattern layer disposed in the peripheral region, and the first conductive pattern layer including a plurality of first electrodes disposed in the active region;
    a plurality of first wirings disposed in the peripheral region connected to the plurality of first electrodes, and
    a plurality of second wirings disposed in the peripheral region and insulated from the plurality of first wirings;
    an organic layer disposed on the first conductive pattern layer and having a plurality of contact holes configured to expose at least a portion of the plurality of second wirings defined therein;
    an index matching layer disposed on the organic layer overlapping the active region and the peripheral region; and
    a second conductive pattern layer disposed on the index matching layer and the organic layer, and connected to the plurality of second wirings through the plurality of contact holes,
    wherein the index matching layer is interposed between the second conductive layer and the organic layer,
    wherein a plurality of openings is defined in the index matching layer adjacent to the contact holes,
    wherein the plurality of openings respectively overlap the contact holes, and
    wherein a first opening part overlapping the plurality of pads and a second opening part entirely overlapping the plurality of contact holes are defined in the index matching layer.

2. The electronic device of claim 1, wherein the plurality of first electrodes extends in a first direction, and includes a plurality of first sensing patterns at least some of which are arranged in the first direction; and a plurality of first connecting patterns which are alternately disposed with the plurality of first sensing patterns and at least some of which connect adjacent first sensing patterns.

3. The electronic device of claim 2, wherein the second conductive pattern layer comprises a plurality of second electrodes at least some of which extend in a second direction transverse to the first direction, and
    the plurality of second electrodes include a plurality of second sensing patterns at least some of which are arranged in the second direction; and a plurality of second connecting patterns which are alternately disposed with the plurality of second sensing patterns and at least some of which connect adjacent second sensing patterns.

4. The electronic device of claim 3, wherein the first conductive pattern layer further comprises a plurality of first dummy patterns disposed in the active region, spaced apart from the plurality of first electrodes, and having at least a portion connected to the plurality of second wirings, the second conductive pattern layer further comprises a plurality of second dummy patterns disposed in the active region and spaced apart from the plurality of second electrodes, wherein the plurality of first dummy patterns overlap the plurality of second sensing patterns and the plurality of second dummy patterns overlap the plurality of first sensing patterns.

5. The electronic device of claim 3, wherein the index matching layer comprises:

a first refraction layer; and a second refraction layer disposed on the first refraction layer and having a refractive index lower than that of the first refractive layer.

6. The electronic device of claim 3, wherein the index matching layer does not overlap the plurality of pads.

7. The electronic device of claim 6, wherein the index matching layer does not overlap the plurality of second wirings.

8. The electronic device of claim 1, wherein the second conductive layer covers one side surface of the index matching layer, the side surface being adjacent to the plurality of contact holes.

* * * * *